United States Patent
Kabutoya et al.

(10) Patent No.: US 10,352,447 B2
(45) Date of Patent: Jul. 16, 2019

(54) GASKET

(75) Inventors: Ryuuichi Kabutoya, Ibaraki (JP);
Hiroyuki Tsubaki, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 12/979,567

(22) Filed: Dec. 28, 2010

(65) Prior Publication Data

US 2011/0156353 A1    Jun. 30, 2011

Related U.S. Application Data

(60) Provisional application No. 61/282,199, filed on Dec. 29, 2009.

(51) Int. Cl.
| | | |
|---|---|---|
| *F16J 15/06* | (2006.01) | |
| *C09J 11/06* | (2006.01) | |
| *C09J 171/02* | (2006.01) | |
| *C09J 7/38* | (2018.01) | |
| *C09J 7/22* | (2018.01) | |

(Continued)

(52) U.S. Cl.
CPC ............. *F16J 15/064* (2013.01); *C09J 7/22* (2018.01); *C09J 7/38* (2018.01); *C09J 11/06* (2013.01); *C09J 171/02* (2013.01); *C08K 5/0066* (2013.01); *C08K 5/523* (2013.01); *C09J 2205/102* (2013.01); *C09J 2471/00* (2013.01)

(58) Field of Classification Search
CPC ........ C09J 7/0246; C09J 171/02; C09J 11/06; C09J 2205/102; C09J 2471/00; C08K 5/0066; C08K 5/523

USPC .................................... 428/40.1, 41.7, 41.8
See application file for complete search history.

(56) References Cited

U.S. PATENT DOCUMENTS

| | | | |
|---|---|---|---|
| 4,839,221 A | | 6/1989 | Asaumi et al. |
| 5,492,336 A | * | 2/1996 | Barna et al. .................. 277/314 |

(Continued)

FOREIGN PATENT DOCUMENTS

| | | |
|---|---|---|
| EP | 2 141 015 | 1/2010 |
| JP | 1-198675 | 8/1989 |

(Continued)

OTHER PUBLICATIONS

Derwent Abstract of JP 2009206194A, see above for date and inventor.*

(Continued)

*Primary Examiner* — Victor S Chang
(74) *Attorney, Agent, or Firm* — Wenderoth, Lind & Ponack, L.L.P.

(57) ABSTRACT

The gasket of the present invention is mainly comprised of a pressure-sensitive adhesive sheet containing a non-halogenated flame retardant, and at least one surface thereof is a pressure-sensitive adhesive face of the pressure-sensitive adhesive sheet containing a non-halogenated flame retardant.

According to the present invention, a highly flame retardant gasket having practically sufficient tight-sealing property, which does not produce a toxic halogen gas during combustion can be realized. In addition, a highly flame retardant gasket having practically sufficient tight-sealing property, which does not produce a toxic halogen gas during combustion, and does not cause corrosion and discoloration of a metal member to be an adherend can be realized.

4 Claims, 3 Drawing Sheets

(51) Int. Cl.
*C08K 5/00* (2006.01)
*C08K 5/523* (2006.01)

(56) References Cited

U.S. PATENT DOCUMENTS

| | | | |
|---|---|---|---|
| 5,804,510 A | | 9/1998 | Spies et al. |
| 6,022,914 A | | 2/2000 | Nowak et al. |
| 2004/0070156 A1 | | 4/2004 | Smith et al. |
| 2005/0171288 A1 | | 8/2005 | Fujimoto et al. |
| 2007/0049707 A1 | * | 3/2007 | Ueda ............... C09J 7/0207 525/474 |
| 2008/0166484 A1 | * | 7/2008 | Smith ............... 427/385.5 |
| 2008/0241452 A1 | | 10/2008 | Kondo et al. |
| 2009/0322040 A1 | * | 12/2009 | Banba et al. ............... 277/654 |
| 2011/0213058 A1 | * | 9/2011 | Yano ............... C08G 18/4854 524/115 |

FOREIGN PATENT DOCUMENTS

| | | |
|---|---|---|
| JP | 5-505666 | 8/1993 |
| JP | 7-233311 | 9/1995 |
| JP | 8-60108 | 3/1996 |
| JP | 8-193187 | 7/1996 |
| JP | 9-176591 | 7/1997 |
| JP | 10-501009 | 1/1998 |
| JP | 11-20092 | 1/1999 |
| JP | 11-26656 | 1/1999 |
| JP | 11-323069 | 11/1999 |
| JP | 2000302981 A * | 10/2000 |
| JP | 2002-356574 | 12/2002 |
| JP | 2003-73641 | 3/2003 |
| JP | 2003-171651 | 6/2003 |
| JP | 2003-292926 | 10/2003 |
| JP | 2004-59851 | 2/2004 |
| JP | 2004-67765 | 3/2004 |
| JP | 2005-140196 | 6/2005 |
| JP | 2006265433 A * | 10/2006 |
| JP | 2009206194 A * | 9/2009 |
| JP | 2010-132820 | 6/2010 |
| WO | 91/10851 | 7/1991 |
| WO | 95/32257 | 11/1995 |
| WO | 2004/031315 | 4/2004 |
| WO | 2008/005816 | 1/2008 |

OTHER PUBLICATIONS

Translation of JP2000-302981, see above for date and inventor.*
Derwent Abstract of JP 2006-265433. See above for date and inventor.*
Japanese Office Action dated Dec. 2, 2011 along with its English translation.
Notice of Reasons for Refusal dated Mar. 25, 2014 in corresponding Japanese Application No. 2012-106644, with English translation thereof.
Extended European Search Report dated Jun. 25, 2013 in corresponding European Application No. 10252229.9.
Office Action dated Oct. 7, 2014 in corresponding Japanese Application No. 2012-106644, with English translation thereof.
Communication Pursuant to Article 94(3) EPC dated Oct. 12, 2017 in European Application No. 10 252 229.9.
Anonymous: "Membrane", Wikipedia, The Free Encyclopedia, Jul. 14, 2017, pp. 1-6, XP055413057, Retrieved from the internet: URL:https://en.wikipedia.org/wiki/Membrane [Retrieved on Oct. 5, 2017].

* cited by examiner (A)

(B)

(A)

(B)

(C)

GASKET

This application claims the benefit of U.S. provisional application Ser. No. 61/282,199 filed Dec. 29, 2009.

TECHNICAL FIELD OF THE INVENTION

The present invention relates to a flame retardant gasket that does not produce toxic halogen gas during combustion.

BACKGROUND OF THE INVENTION

Conventionally, to prevent seepage of liquid or gas between two opposing faces in various machines and apparatuses or other structures, a gasket is set between the two opposing faces.

For example, an antenna to aid communication between aircrafts and distant places is set on the outer surface of the body wall (outer board) of the aircrafts. Many of such antennas have a plate-like fixing board having an electric connector protruding from one surface thereof. The surface of the fixing board having the protruding electric connector is superposed on the outer face of the outer board, the connector is inserted into the inside of an aircraft from the hole formed on the outer board of the aircraft, and connected to an appropriate electric circuit in the aircraft. In this case, the fixing board of the antenna is generally installed removably with a bold on the outer board of the aircraft, where a gasket is set between the outer face of the outer board and the inner face of the antenna fixing board to seal the antenna fixing board.

To be specific, a bold hole is formed at the corresponding positions of the antenna fixing board and the outer board of an aircraft, a gasket having a through-hole formed at a position corresponding to the bold hole in the antenna fixing board and the outer board of the aircraft is placed between them, a bold is inserted from the outside of the antenna fixing board into the through-hole of the antenna fixing board, the gasket and the outer board of the aircraft, and a blind nut is set on the inner face of the outer board of the aircraft, whereby the antenna is fixed. In so doing, the gasket is compressed by the deformation of the fixing board due to bolding, which in turn provides a seal of the bold and the bold pore, as well as the outer board of the aircraft and the fixing board. Consequently, penetration of moisture into the aircraft can be prevented.

As a gasket used for sealing such an antenna fixing member on the outer board of an aircraft, for example, US2004/0070156A1 proposes a gasket material wherein an adhesive layer of a flexible polyurethane gel is formed on both the front and the back of a carrier sheet (substrate film). This publication describes that a gasket having an adhesive layer of a polyurethane gel maintains superior sealing property, since polyurethane gel is superior in the flexibility, elasticity, conpressibility, flexibility and the like, and non-reactive with the constituent materials (specifically aluminum etc.) of the outer board of aircrafts and antenna fixing board, and water (including brine).

There are many structures comprising two members with each surface facing the other surface (that is, forming a matching face of the two opposing faces), which are fixed not only at the fixing part of function articles on the above-mentioned outer board of an aircraft but also inside the aircraft.

In general, aircraft members are required to have high flame retardancy. Therefore, gasket is also requested to have high flame retardancy, and contains a halogenated flame retardant showing high flame retardancy. Although a gasket containing a halogenated flame retardant shows high flame retardancy, it produces a large amount of toxic halogen gas during molding processing and combustion to possibly corrode instruments and adversely influence human body and environment. Therefore, a gasket showing high flame retardancy, which does not generate toxic halogen gas during combustion, has been demanded. Moreover, since many of the members to be closely adhered to the gasket are metal plates, the gasket is required to have properties that do not discolor or corrode metal plates.

SUMMARY OF THE INVENTION

The present invention has been made in view of the above-mentioned situation and aims to provide a gasket with high flame retardancy which does not produce a toxic halogen gas during combustion.

Moreover, the present invention provides a gasket with high flame retardancy which does not generate a toxic halogen gas during combustion, and does not cause corrosion and discoloration of a metal member to be an adherend.

The present inventors have conducted intensive studies in an attempt to solve the aforementioned problems and found that a pressure-sensitive adhesive sheet obtained by adding a non-halogenated flame retardant (particularly phosphorus flame retardant) to a polyoxyalkylene adhesive, an acrylic adhesive, a silicone adhesive and the like can provide a gasket with sufficiently high flame retardancy. Further studies based on such finding have resulted in the completion of the present invention.

Accordingly, the present invention relates to, in gaskets mainly comprised of a pressure-sensitive adhesive sheet containing a non-halogenated flame retardant, a gasket wherein at least one surface is a pressure-sensitive adhesive face of the aforementioned pressure-sensitive adhesive sheet containing a non-halogenated flame retardant.

In the gasket of the present invention, the non-halogenated flame retardant is preferably a phosphorus flame retardant.

In the gasket of the present invention, moreover, the pressure-sensitive adhesive sheet containing a non-halogenated flame retardant preferably contains a tackifier resin, and the tackifier resin is preferably a terpene based tackifier resin and/or a rosin based tackifier resin. The rosin based tackifier resin is preferably a rosin ester, and the terpene based tackifier resin is preferably a terpenephenol resin.

In the gasket of the present invention, moreover, the pressure-sensitive adhesive sheet containing a non-halogenated flame retardant is preferably a polyoxyalkylene pressure-sensitive adhesive sheet containing a non-halogenated flame retardant, and the polyoxyalkylene pressure-sensitive adhesive sheet containing a non-halogenated flame retardant is preferably a pressure-sensitive sheet comprised of a cured product of a composition comprising the following components A-D:

A: a polyoxyalkylene polymer having at least one alkenyl group in one molecule
B: a compound containing two or more hydrosilyl groups on average in one molecule
C: a hydrosilylation catalyst
D: a non-halogenated flame retardant.

In addition, the gasket of the present invention includes an embodiment wherein the both surfaces of the gasket to be closely adhered to adherends are surfaces of pressure-sensitive adhesive sheets containing a non-halogenated flame retardant.

The gasket of the present invention includes an embodiment wherein a substrate film is laminated on one surface of a pressure-sensitive adhesive sheet containing a non-halogenated flame retardant, one surface of a gasket to be closely adhered to an adherend is a surface of the substrate film, and the other surface of the gasket to be closely adhered to an adherend is a pressure-sensitive adhesive face of the pressure-sensitive adhesive sheet containing a non-halogenated flame retardant. In the gasket of such embodiment, the substrate film is preferably a fluororesin film.

In addition, the present invention provides a method of tightly sealing two opposing faces, comprising placing the aforementioned gasket between the two opposing faces.

According to the present invention, a flame retardant gasket having practically sufficient tight-sealing property, which does not produce a toxic halogen gas during combustion can be realized. In addition, a flame retardant gasket having practically sufficient tight-sealing property, which does not produce a toxic halogen gas during combustion, and does not cause corrosion and discoloration of a metal member to be an adherend can be realized.

In a preferable embodiment, moreover, a flame retardant gasket having extremely high flame retardancy meeting the high level of flame retardancy particularly required of aircraft members (i.e., grade "V-0" in the standard "UL-94" of US UL (Underwriters Laboratories)), which does not produce a toxic halogen gas during combustion and does not cause corrosion and discoloration of a metal member to be an adherend can be realized.

In the Figures, 1 is a pressure-sensitive adhesive sheet containing a non-halogenated flame retardant, 2 is a substrate film, 3 is a core film, 4 is a release sheet, 10 is a gasket, 10A, 10B are surfaces of the gasket to be closely adhered to adherends, and 20, 21 are adherends.

DETAILED DESCRIPTION OF THE INVENTION

The present invention is explained in the following by referring to preferable embodiments.

Figure 1:
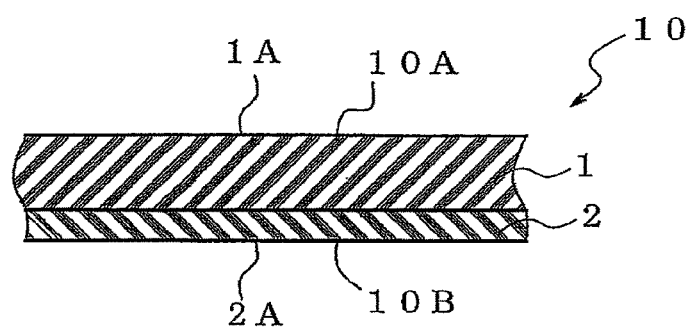
FIG. 1 is a schematic sectional view of a typical embodiment of the gasket of the present invention.
Figure 2:
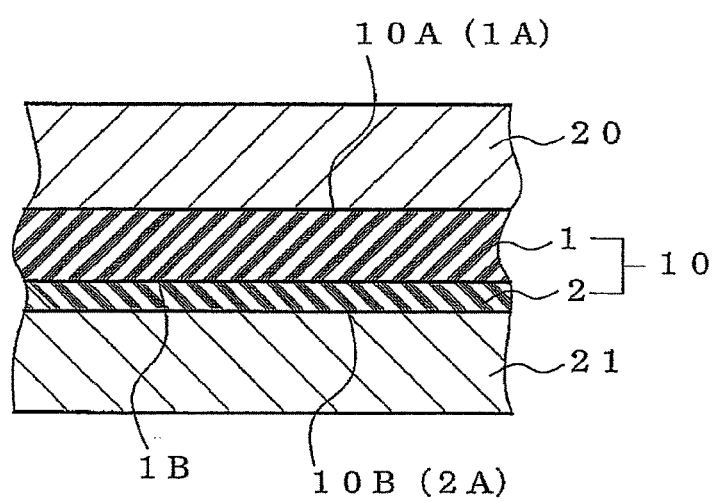
FIG. 2 is a schematic sectional view of the gasket of FIG. 1 placed between two adherends, with tightly sealed two opposing faces.

FIG. 1 is a schematic sectional view of one embodiment of the gasket 10 of the present invention, and FIG. 2 is a schematic sectional view of the gasket 10 of FIG. 1 placed between two adherends, with tightly sealed two opposing faces.

The gasket of the present invention mainly comprises, as shown in the gasket 10 of the above embodiment, a pressure-sensitive adhesive sheet 1 containing a non-halogenated flame retardant 1, and is placed between opposing faces of two adherends 20, 21 during use (i.e., between opposing faces of the two surfaces) (FIG. 2).

At least one of both surfaces 10A, 10B of the gasket to be closely adhered to adherends 20, 21 (i.e., at least one surface of gasket) is a surface (pressure-sensitive adhesive face) 1A of the pressure-sensitive adhesive sheet 1. Since the surface 1A of the pressure-sensitive adhesive sheet 1 adheres to the adherend 20, gasket 10 is arranged between the opposing faces of the two adherends 20, 21 without misalignment.

In the gasket 10 of the above embodiment, a substrate film 2 is laminated on one surface 1B of the pressure-sensitive adhesive sheet 1, and surface 2A of the substrate film 2 is closely adhered to adherend 21. The gasket of the present invention may be constituted with the pressure-sensitive adhesive sheet 1 alone without laminating the substrate film 2, and both surfaces of the pressure-sensitive adhesive sheet 1 may be adhered to each of the two adherends.

Figure 3:
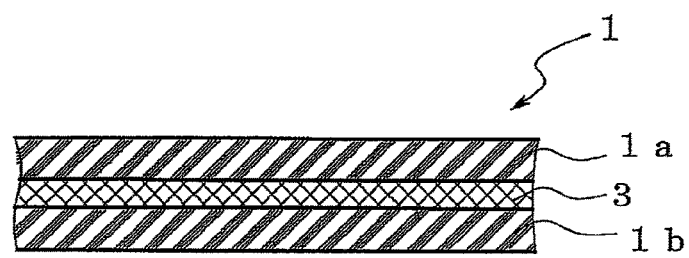
FIG. 3 shows a schematic sectional view of the principal parts of a modified example of the gasket of the present invention.

In the gasket 10 of the above embodiment, the pressure-sensitive adhesive sheet 1 may be a sheet without a core. It may be a pressure-sensitive adhesive sheet with a core wherein, as shown in FIG. 3, adhesive layers 1a, 1b containing a non-halogenated flame retardant are formed on both front and the back surfaces of a core film 3 as an intermediate layer.

[Pressure-Sensitive Adhesive Sheet Containing a Non-Halogenated Flame Retardant]

The pressure-sensitive adhesive sheet 1 containing a non-halogenated flame retardant in the present invention is a pressure-sensitive adhesive sheet containing a non-halogenated flame retardant, which is constituted with an adhesive composition containing a pressure-sensitive adhesive and a non-halogenated flame retardant.

The thickness of the pressure-sensitive adhesive sheet 1 is, in general, preferably not less than 300 µm, more preferably not less than 800 µm, from the aspects of adhesion to adherend, further improved closed state during bolt penetration and the like. In addition, to suppress exuding of adhesive and prevent deterioration of workability, the thickness is preferably not more than 2000 µm, more preferably not more than 1500 µm.

While the pressure sensitive adhesive to be used for the pressure-sensitive adhesive sheet 1 is not particularly limited, those capable of forming a pressure-sensitive adhesive sheet superior in the elasticity, compressibility and adhesion are preferable. For example, acrylic, silicone or polyoxyalkylene adhesives can be mentioned. Among these, polyoxyalkylene adhesive is superior in the elasticity, compressibility and adhesion, and can form a pressure-sensitive adhesive sheet superior in the removability. Use of the polyoxyalkylene adhesive is preferable, since a gasket can be easily separated from an adherend during maintenance.

(Acrylic Adhesive)

Specifically, as the acrylic adhesive, an acrylic adhesive containing, as a base polymer, an acrylic polymer with a monomer unit of alkyl(meth)acrylate as a main backbone is preferable (here, the "(meth)acrylate" means "acrylate and/or methacrylate").

The average carbon number of the alkyl group of the alkyl(meth)acrylate constituting the main backbone of the acrylic polymer is preferably about 1 to 12. Specific examples of such alkyl(meth)acrylate include methyl(meth)acrylate, ethyl(meth)acrylate, n-butyl(meth)acrylate, 2-ethylhexyl(meth)acrylate, isooctyi(meth)acrylate, isononyl (meth)acrylate, lauryl (meth)acrylate and the like. One or more kinds of these are used in combination. Among these, alkyl(meth)acrylate wherein the carbon number of the alkyl group is 1 to 9 is preferable.

One or more kinds of various monomers are introduced into an acrylic polymer by copolymerization to improve adhesiveness to an adherend and heat resistance of the pressure-sensitive adhesive sheet containing a non-halogenated flame retardant. Specific examples of such copolymerizable monomer include monomers containing a hydroxyl group such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, (4-hydroxymethylcyclohexyl) methyl (meth)acrylate and the like; monomers containing a carboxyl group such as (meth)acrylic acid, carboxyethyl (meth)acrylate, carboxypentyl(meth)acrylate, itaconic acid, maleic acid, fumaric acid, crotonic acid and the like; monomers containing an acid anhydride group such as maleic anhydride, itaconic anhydride and the like; caprolactone adduct of acrylic acid; monomers containing a sulfo group such as styrenesulfonic acid, allylsulfonic acid, 2-(meth)acrylamide-2-methylpropanesulfonic acid, (meth)acrylamidepropanesulfonic acid, sulfopropyl (meth)acrylate, (meth) acryloyloxynaphthalenesulfonic acid and the like; monomers containing a phosphate group such as 2-(phosphonooxy)ethyl acrylate etc., and the like. In addition, nitrogen containing vinyl monomers can be mentioned, for example, maleimide, N-cyclohexylmaleimide, N-phenylmaleimide; N-acryloylmorpholine; (N-substitution) amide monomers such as (meth)acrylamide, N,N-dimethyl (meth)acrylamide, N,N-diethyl(meth)acrylamide, N-hexyl (meth)acrylamide, N-methyl(meth)acrylamide, N-butyl (meth)acrylamide, N-butyl(meth)acrylamide, N-methylol (meth)acrylamide, N-methylolpropane(meth)acrylamide and the like; alkylaminoalkyl (meth)acrylate monomers such as aminoethyl (meth)acrylate, aminopropyl (meth)acrylate, N,N-dimethylaminoethyl (meth)acrylate, t-butylaminoethyl (meth)acrylate, 3-(3-pyridinyl)propyl(meth) acrylate and the like; alkoxyalkyl (meth)acrylate monomers such as methoxyethyl (meth)acrylate, ethoxyethyl (meth) acrylate and the like; succinimide monomers such as N-(meth)acryloyloxymethylenesuccinimide, N-(meth)acryloyl-6-oxyhexamethylenesuccinimide, N-(meth)acryloyl-8-oxyoctamethylenesuccinimide, N-acryloylmorpholine etc., and the like can be mentioned.

Furthermore, vinyl monomers such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic acid amides, styrene, α-methylstyrene, N-vinylcaprolactam and the like; cyanoacrylate monomers such as acrylonitrile, methacrylonitrile and the like; epoxy group-containing acrylic monomers such as glycidyl (meth)acrylate and the like; glycol acrylate monomers such as polyethylene glycol (meth)acrylate, polypropyleneglycol (meth)acrylate, methoxyethyleneglycol (meth)acrylate, methoxypolypropyleneglycol (meth)acrylate and the like; acrylate monomers such as tetrahydrofurfuryl (meth)acrylate, fluorine-containing (meth)acrylate, silicone (meth)acrylate, 2-methoxyethylacrylate etc., and the like can also be mentioned.

Among these, when an isocyanate based crosslinking agent is used as a crosslinking agent, a hydroxyl group-containing monomer is preferable since the reactivity with the isocyanate group is good. Carboxyl group-containing monomers such as (meth)acrylic acid and the like are preferable and acrylic acid is particularly preferable in view of the adhesiveness of the pressure-sensitive adhesive sheet containing a non-halogenated flame retardant to an adherend, adhesion durability, weatherability and the like.

The weight ratio of the copolymerizable monomer in the acrylic polymer is preferably about 0.1-10 wt %.

While the average molecular weight of the acrylic polymer is not particularly limited, the weight average molecular weight is generally about 300,000 to 2,500,000.

Acrylic polymers are produced by various known methods and, for example, radical polymerization methods such as bulk polymerization method, solution polymerization method, suspension polymerization method and the like can be appropriately employed. As a radical polymerization initiator, various known azo based initiators and peroxide based initiators can be used. The reaction temperature is generally about 50 to 80° C., and the reaction time is 1 to 8 hr.

The acrylic adhesive can contain a crosslinking agent in addition to a base polymer, and the crosslinking agent can improve adhesion to an optical plate and durability, and can provide reliability at a high temperature and maintain the form of the adhesive itself. As the crosslinking agent, a known crosslinking agent such as isocyanate based crosslinking agents, epoxy based crosslinking agents, peroxide based crosslinking agents, metal chelate based crosslinking agents, oxazoline based crosslinking agents and the like can be appropriately used. One or more kinds of these crosslinking agents can be used in combination. The amount of the crosslinking agent to be used is not more than 10 parts by weight, preferably 0.01-5 parts by weight, more preferably 0.02-3 parts by weight, relative to 100 parts by weight of the acrylic polymer. A ratio of the crosslinking agent exceeding 10 parts by weight is not preferable, since crosslinking may proceed too much to decrease adhesiveness.

(Silicone Adhesive)

The silicone adhesive is not particularly limited, and peroxide crosslinked silicone adhesives (peroxide curable silicone adhesive) and addition reaction silicone adhesives, which are generally used, can be preferably used. These peroxide crosslinked silicone adhesives and addition reaction silicone adhesives may be commercially available products. Specific examples of the peroxide crosslinked silicone adhesive include KR-3006A/BT manufactured by Shin-Etsu Chemical Co., Ltd., SH 4280 PSA manufactured by Toray Dow Corning Corporation Silicone and the like. Specific examples of the addition reaction silicone adhesive include X-40-3501 manufactured by Shin-Etsu Chemical Co., Ltd., BY 24-712 manufactured by Toray Dow Corning Corporation Silicone, TSE32X manufactured by Momentive Performance Materials Inc and the like.

(Polyoxyalkylene Adhesive)

As the polyoxyalkylene adhesive, a cured product of a composition containing the following components A-C is preferable:

A: a polyoxyalkylene polymer having at least one alkenyl group in each molecule

B: a compound containing two or more hydrosilyl groups on average in each molecule C: a hydrosilylation catalyst.

The above-mentioned "polyoxyalkylene polymer having at least one alkenyl group in each molecule" for component A is not particularly limited, and various polymers can be used. However, one wherein the main chain of the polymer has a repeat unit represented by the formula (1) shown below is preferable:

$$-R^1-O-  \quad \text{formula (1)}$$

wherein $R^1$ is an alkylene group.

$R^1$ is preferably a linear or branched alkylene group having 1 to 14, more preferably 2 to 4, carbon atoms.

As specific examples of the repeat unit represented by the general formula (1), —CH$_2$O—, —CH$_2$CH$_2$O—, —CH$_2$CH(CH$_3$)O—, —CH$_2$CH(C$_2$H$_5$)O—, —CH$_2$C(CH$_3$)$_2$O—, —CH$_2$CH$_2$CH$_2$CH$_2$O— and the like can be included. The main chain skeleton of the polyoxyalkylene polymer may consist of only one kind of repeat unit, and may consist of two kinds or more of repeat units. Particularly, from the aspects of availability and workability, a polymer having —CH$_2$CH(CH$_3$)O— as a main repeat unit is preferable. In the main chain of the polymer, a repeat unit other than the oxyalkylene group may be contained. In this case, the total sum of oxyalkylene units in the polymer is preferably not less than 80% by weight, particularly preferably not less than 90% by weight.

Although the polymer of component A may be a linear polymer or a branched polymer, or a mixture thereof, it preferably contains a linear polymer in a proportion of not less than 50% by weight, so that the adhesive layer will show good adhesiveness to the surface of various materials.

The molecular weight of the polymer of component A is preferably 500 to 50,000, more preferably 5,000 to 30,000, in terms of number average molecular weight. When the number average molecular weight is less than 500, the obtained cured product tends to be too brittle, and when the number average molecular weight exceeds 50,000, the viscosity becomes unfavorably too high to markedly decrease workability. The number average molecular weight here means the value obtained by Gel Permeation Chromatography (GPC) method.

The polymer of component A preferably has a narrow molecular weight distribution wherein the ratio of weight-average molecular weight and number-average molecular weight (Mw/Mn) is not more than 1.6; a polymer having an Mw/Mn of not more than 1.6 produces a decreased viscosity of the composition and offers improved workability. Hence, the Mw/Mn is more preferably not more than 1.5, still more preferably not more than 1.4. As mentioned herein, Mw/Mn refers to a value obtained by the gel permeation chromatography (GPC) method.

Here, the molecular weight. (based on polystyrene) is measured by the GPC method using GPC apparatus (HLC-8120GPC) manufactured by Tosoh Corporation, where the measurement conditions are as follows.

sample concentration: 0.2 wt % (THF solution)
sample injection volume: 10 μl
eluent: THF
flow rate: 0.6 ml/min
measurement temperature: 40° C.
column: sample column TSKgel GMH-H(S)
detector: differential refractometer With regard to the polymer of component A (polyoxyalkylene polymer having at least one alkenyl group in each molecule), the alkenyl group is not subject to limitation, but an alkenyl group represented by the formula (2) shown below is suitable:

$$H_2C=C(R^2) \qquad \text{formula (2)}$$

wherein $R^2$ is hydrogen or a methyl group.

The mode of binding of the alkenyl group to the polyoxyalkylene polymer is not subject to limitation; for example, alkenyl group direct bond, ether bond, ester bond, carbonate bond, urethane bond, urea bond and the like can be included.

As specific examples of the polymer of component A, a polymer represented by the general formula (3): $\{H_2C=C(R^{3a})-R^{4a}-O\}a_1R^{5a}$ wherein $R^{3a}$ is hydrogen or a methyl group; $R^{4a}$ is a divalent hydrocarbon group having 1 to 20 carbon atoms, optionally having one or more ether groups, $R^{5a}$ is a polyoxyalkylene polymer residue; $a_1$ is a positive integer, can be included. As $R^{4a}$ in the formula, specifically, —CH$_2$—, —CH$_2$CH$_2$—, —CH$_2$CH$_2$CH$_2$—, —CH$_2$CH(CH$_3$)CH$_2$—, —CH$_2$CH$_2$CH$_2$CH$_2$—, —CH$_2$CH$_2$OCH$_2$CH$_2$—, or —CH$_2$CH$_2$OCH$_2$CH$_2$CH$_2$— and the like can be included; for the ease of synthesis, —CH$_2$— is preferable.

A polymer having an ester bond, represented by the formula (4):

$$\{H_2C=C(R^{3b})-R^{4b}-OCO\}a_2R^{5b}$$

wherein $R^{3b}$, $R^{4b}$, $R^{5b}$ and $a_2$ have the same definitions as those of $R^{3a}$, $R^{4a}$, $R^{5a}$, and $a_1$, respectively, can also be included.

A polymer represented by the formula (5): $\{H_2C=C(R^{3c})\}a_3R^{5c}$ wherein $R^{3c}$, $R^{5c}$ and $a_3$ have the same definitions as those of $R^{3a}$, $R^{5a}$, and $a_1$, respectively, can also be included.

Furthermore, a polymer having a carbonate bond, represented by the formula (6): $\{H_2C=C(R^{3d})-R^{4d}-O(CO)O\}a_4R^{5d}$ wherein $R^{3d}$, $R^{4d}$, $R^{5d}$ and $a_4$ have the same definitions as those of $R^{3a}$, $R^{4a}$, $R^{5a}$ and $a_1$, respectively, can also be included.

It is preferable that at least 1, preferably 1 to 5, more preferably 1.5 to 3, alkenyl groups be present in each molecule of the polymer of component A. If the number of alkenyl groups contained in each molecule of the polymer of component A is less than 1, the curing is insufficient; if the number exceeds 5, the mesh structure becomes so dense that the polymer sometimes fails to exhibit a good adherence. The polymer of component A can be synthesized according to the method described in JP-A-2003-292926, and any commercially available product can be used.

Any component B compound containing two or more hydrosilyl groups on average in each molecule can be used without limitation, as long as it has a hydrosilyl group (a group having an Si—H bond), but from the viewpoint of the ease of obtainment of raw materials and compatibility with the component A, an organohydrogen polysiloxane modified with an organic constituent is particularly preferable. The aforementioned polyorganohydrogen siloxane modified with an organic constituent more preferably has an average of 2 to 8 hydrosilyl groups in each molecule. Specific examples of the structure of the polyorganohydrogen siloxane include linear or cyclic ones represented by, for example:

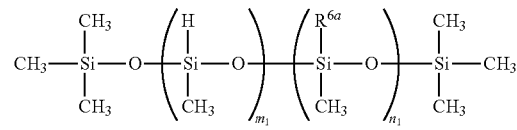

wherein $2 \leq m_1 + n_1 \leq 50$, $2 \leq m_1$, and $0 \leq n_1$, $R^{6a}$ is a hydrocarbon group having 2 to 20 carbon atoms in the main chain thereof, optionally comprising one or more phenyl groups,

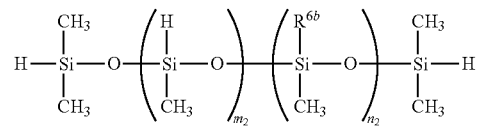

wherein $0 \le m_2+n_2 \le 50$, $0 \le m_2$, and $0 \le n_2$, $R^{6b}$ is a hydrocarbon group having 2 to 20 carbon atoms in the main chain thereof, optionally comprising one or more phenyl groups, or

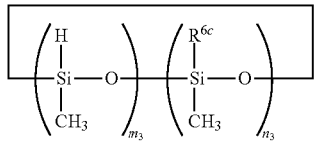

wherein $3 \le m_3+n_3 \le 20$, $2 \le m_3 \le 19$, and $0 \le n_3 < 18$, $R^{6c}$ is a hydrocarbon group having 2 to 20 carbon atoms in the main chain thereof, optionally having one or more phenyl groups, and the like, and ones having two or more of these units, represented by the following:

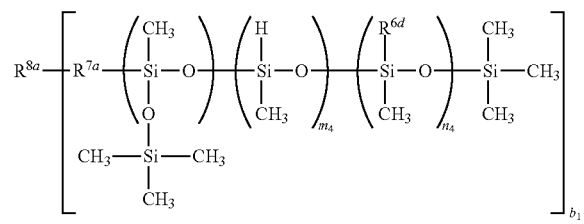

wherein $1 \le m_4+n_4 \le 50$, $1 \le m_4$, and $0 \le n_4$, $R^{6d}$ is a hydrocarbon group having 2 to 20 carbon atoms in the main chain thereof, optionally having one or more phenyl groups, $2 \le b_1$, $R^{8a}$ is a divalent to tetravalent organic group, and $R^{7a}$ is a divalent organic group, but $R^{7a}$ may be absent depending on the structure of $R^{8a}$,

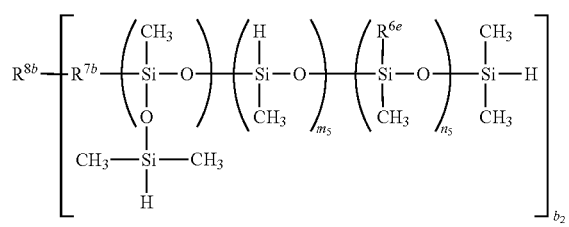

wherein $0 \le m_5+n_5 \le 50$, $0 \le m_5$, and $0 \le n_5$, $R_{6e}$ is a hydrocarbon group having 2 to 20 carbon atoms in the main chain thereof, optionally having one or more phenyl groups, $2 \le b_2$, $R^{8b}$ is a divalent to tetravalent organic group, and $R^{7b}$ is a divalent organic group, however, $R^{7b}$ may be absent depending on the structure of $R^{8b}$, or

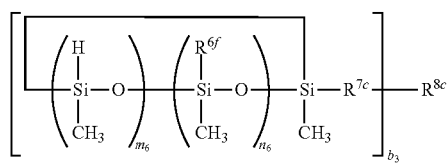

wherein $3 \le m_6+n_6 \le 50$, $1 \le m_6$, and $0 \le n_6$, $R^{6f}$ is a hydrocarbon group having 2 to 20 carbon atoms in the main chain thereof, optionally comprising one or more phenyl groups, $2 \le b_3$, $R^{8c}$ is a divalent to tetravalent organic group, and $R^{7c}$ is a divalent organic group, however, $R^{7c}$ may be absent depending on the structure of $R^{8c}$, and the like.

The "compound containing two or more hydrosilyl groups on average in each molecule" for component B preferably has good compatibility with the component A and the component C, or good dispersion stability in the system. Particularly, if the viscosity of the entire system is low, use of an ingredient whose compatibility with any of the above-described ingredients is low as the component B sometimes causes phase separation and a curing failure.

As a specific example of the component B having relatively good compatibility with the component A and the component C, or relatively good dispersion stability, the following can be included.

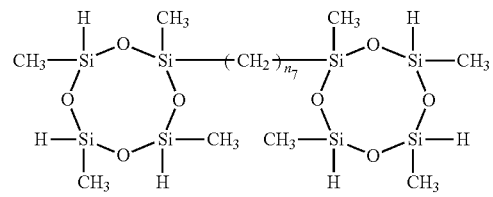

wherein $n_7$ is an integer of not less than 4 and not more than 10,

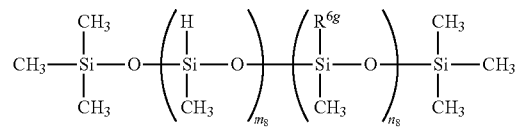

wherein $2 \le m_8 \le 10$ and $R^{6g}$ is a hydrocarbon group having eight or more carbon atoms.

As specific preferable examples of the component B, polymethylhydrogen siloxane can be included; for assuring compatibility with the component A and adjusting the SiH content, a compound modified with α-olefin, styrene, α-methylstyrene, allylalkyl ether, allylalkyl ester, allylphenyl ether, allylphenyl ester or the like can be included; as an example, the following structure can be included.

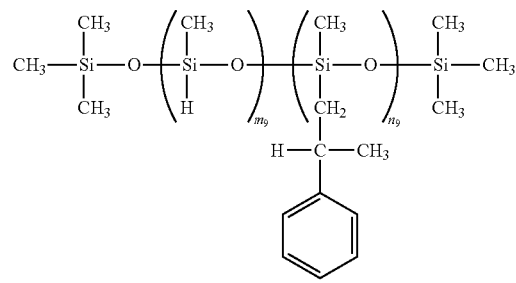

wherein $2 \le m_9 \le 20$ and $1 \le n_9 \le 20$.

The component B can be synthesized by a commonly known method, and any commercially available product can be used.

In the present invention, the component C "hydrosilylation catalyst" is not subject to limitation; an optionally chosen one can be used. As specific examples, chloroplatinic acid; platinum; solid platinum carried by a carrier such as alumina, silica, or carbon black; a platinum-vinylsiloxane complex {for example, $Pt_n(ViMe_2SiOSiMe_2Vi)_m$, $Pt[(Me-ViSiO)_4]_m$ and the like}; a platinum-phosphine complex {for example, $Pt(PPh_3)_4$, $Pt(PBu_3)_4$ and the like}; a platinum-phosphite complex {for example, $Pt[P(OPh)_3]_4$, $Pt[P(OBu)_3]_4$ and the like}; $Pt(acac)_2$; the platinum-hydrocarbon conjugates described in U.S. Pat. Nos. 3,159,601 and 3,159,662 of Ashby et al.; the platinum alcoholate catalyst described in U.S. Pat. No. 3,220,972 of Lamoreaux et al. and the like can be included. (In these formulas, Me represents a methyl group, Bu represents a butyl group, Vi represents a vinyl group, Ph represents a phenyl group, acac represents an acetylacetonate, and each of n and m represents an integer.)

As examples of catalysts other than platinum compounds, $RhCl(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$, $TiCl_4$ and the like can be included.

These catalysts may be used alone, and may be used in combination of 2 kinds or more. With regard to catalyst activity, chloroplatinic acid, a platinum-phosphine complex, a platinum-vinylsiloxane complex, $Pt(acac)_2$ and the like are preferable.

Although the amount of the component C formulated is not subject to limitation, from the viewpoint of assurance of composition potlife and transparency of the cured product (adhesive layer), the amount is generally not more than $1 \times 10^{-1}$ mol, preferably not more than $5.3 \times 10^{-2}$ mol, relative to 1 mol of alkenyl groups in the component A; particularly, from the viewpoint of transparency of the cured product (adhesive layer), the amount is more preferably not more than $3.5 \times 10^{-2}$ mol, particularly preferably not more than $1.4 \times 10^{-3}$ mol. When the amount exceeds $1 \times 10^{-1}$ mol relative to 1 mol of alkenyl groups in the component A, the finally obtained cured product (adhesive layer) is likely to undergo yellowing and the transparency of the cured product (adhesive layer) tends to be damaged. When the amount of the component C formulated is too low, the composition curing speed is slow, and the curing quality tends to be unstable; therefore, the amount is preferably not less than $8.9 \times 10^{-5}$ mol, more preferably not less than $1.8 \times 10^{-4}$ mol.

The composition comprising the above-described components A to C is cured by heating. That is, the alkenyl group of component A (polyoxyalkylene polymer having at least one alkenyl group in each molecule) is hydrosilylated by the hydrosilyl group (group having Si—H bond) of component B (compound containing two or more hydrosilyl groups on average in each molecule) in the presence of a hydrosilylation catalyst (component C) to allow crosslinking to proceed, whereby curing is completed. The cured product is characterized by the ability to exhibit its tacky characteristic (function to adhere to other object) even without addition, or with addition of a small amount, of an adhesiveness-imparting resin. It has low activity, and does not react upon contact with various substances such as water, metal, plastic material and the like.

In a composition comprising components A to C, it is preferable that the hydrosilyl groups of the component B (compound B) be contained (formulated) so that the functional group ratio to the alkenyl groups of the component A (compound A) will be not less than 0.3 and less than 2, more preferably not less than 0.4 and less than 1.8, and still more preferably not less than 0.5 and less than 1.5. When the hydrosilyl groups are contained so that the foregoing functional group ratio will exceed 2, the crosslinking density increases, and it is sometimes impossible to obtain adhesiveness without the addition, or with the addition of a small amount, of an adhesiveness-imparting resin. When the functional group ratio is less than 0.3, crosslinking in the cured product becomes too weak, and retention of characteristics at high temperatures may become difficult. Hence, by setting a blending ratio of the component A and the component B to fall within a particular range, good adhesiveness composition can be achieved even without adding an adhesiveness-imparting resin and, in addition, a pressure-sensitive adhesive sheet can be obtained while curing the composition at a practically sufficiently fast line speed.

(Non-Halogenated Flame Retardant)

In the present invention, the non-halogenated flame retardant is not particularly limited, and known flame retardants free of halogen atom such as hydrated metal compound based flame retardants, inorganic compound based flame retardants, phosphorus flame retardant, silicone flame retardant, nitrogen compound based flame retardants, organic metal compound based flame retardants and the like can be used. Of these, phosphorus flame retardants are preferable since they can impart flame retardancy and are superior in the suppression of drip during combustion, compatibility to environmental regulation and the like.

Examples of the hydrated metal compound based flame retardant include aluminum hydroxide, magnesium hydroxide, calcium hydroxide and the like. Examples of the inorganic compound based flame retardant include antimony compound, zinc borate, zinc stannate, molybdenum compound, zinc oxide, zinc sulfide, zeolite, titanium oxide, nano filler (montmorillonite (MMT), nano hydrated metal compound, silica), carbon nanotube, calcium carbonate and the like.

Examples of the phosphorus flame retardant include phosphates, aromatic condensed phosphates, ammonium polyphosphates and the like. Specific examples of the phosphate include triphenyl phosphate, tricresyl phosphate (TCP), cresyl diphenyl phosphate (CDP), 2-ethylhexyldiphenyl phosphate, triethyl phosphate (TEP), tri-n-butyl phosphate, trixylenyl phosphate, xylenyl diphenyl phosphate (XDP) and the like. Specific examples of the aromatic condensed phosphate include resorcinol bisdiphenyl phosphate, bisphenol A bis(diphenyl phosphate), resorcinol bisdixylenyl phosphate and the like. Specific examples of the ammonium polyphosphate include ammonium polyphosphate (APP), melamine-modified ammonium polyphosphate and coated ammonium polyphosphate. Here, the coated ammonium polyphosphate is obtained by coating or microcapsulating ammonium polyphosphate with a resin to enhance water resistance. The phosphate, aromatic condensed phosphate and ammonium polyphosphate can be used concurrently. A combined use of phosphate and ammonium polyphosphate is preferable since flame retardancy in both the solid phase and gaseous phase can be achieved by a combination of a flame retardancy effect of a char layer formed by phosphate and a flame retardancy effect of noncombustible gas production by ammonium polyphosphate.

Examples of the silicone flame retardant include dimethylsilicone, amino-modified silicone, epoxy-modified silicone and the like.

Examples of the nitrogen compound based flame retardant include hindered amine compounds, melamine cyanurate, triazine compounds, guanidine compounds and the like.

Examples of the organic metal compound based flame retardant include copper ethylenediaminetetraacetate, calcium perfluorobutanesulfonate and the like.

One or more kinds of the non-halogenated flame retardants can be used in a mixture. While the amount thereof to be used varies depending on the kind of the flame retardant, it is generally preferably not less than 10 parts by weight, more preferably not less than 20 parts by weight, particularly preferably not less than 30 parts by weight, relative to 100 parts by weight of the adhesive, since the effects of flame retardancy, drip suppression by char layer formation and the like can be efficiently achieved. It is preferably not more than 350 parts by weight, more preferably not more than 250 parts by weight, particularly preferably not more than 150 parts by weight, since more superior adhesive property, preservability and the like can be obtained.

(Tackifier Resin)

In the present invention, the pressure-sensitive adhesive sheet 1 containing a non-halogenated flame retardant can contain a tackifier resin to improve adhesion of a gasket to an adherend and flame retardancy. Examples of the tackifier resin include terpene tackifier resin, phenol tackifier resin, rosin based tackifier resin, petroleum tackifier resin and the like. One or more kinds of tackifier resin can be used.

Examples of the terpene tackifier resin include terpene resins such as α-pinene polymer, β-pinene polymer, dipentene polymer and the like, modified terpene resins (e.g., terpenephenol resin, styrene-modified terpene resin, aromatic-modified terpene resin, hydrogenated terpene resin etc.) obtained by modifying (phenol-modification, aromatic-modification, hydrogenated-modification, hydrocarbon-modification etc.) these terpene resins, and the like.

Examples of the phenol tackifier resin include condensates (e.g., alkylphenol resin, xyleneformaldehyde resin and the like) of various phenols (e.g., phenol, m-cresol, 3,5-xylenol, p-alkylphenol, resorcin etc.) and formaldehyde, resol obtained by addition reaction of the aforementioned phenol with formaldehyde using an alkali catalyst, novolac obtained by condensation reaction of the aforementioned phenol with formaldehyde using an acid catalyst and the like.

Examples of the rosin based tackifier resin include unmodified rosin (natural rosin) such as gum rosin, wood rosin, tall oil rosin and the like, modified rosin (hydrogenated rosin, disproportionated rosin and polymerized rosin, and other chemically-modified rosin etc.) obtained by modifying the above unmodified rosins by hydrogenation, disproportionation, polymerization and the like, various rosin derivatives and the like. Examples of the aforementioned rosin derivative include rosin esters such as modified rosin ester compound obtained by esterifying modified rosin (rosin ester compound obtained by esterifying unmodified rosin with an alcohol, hydrogenated rosin, disproportionated rosin, polymerized rosin and the like) with an alcohol and the like; unsaturated fatty acid-modified rosins obtained by modifying unmodified rosin or modified rosin (hydrogenated rosin, disproportionated rosin, polymerized rosin etc.) with unsaturated fatty acid; unsaturated fatty acid modified rosin ester obtained by modifying rosin ester with an unsaturated fatty acid; rosin alcohols obtained by reduction-treating a carboxyl group in unmodified rosin, modified rosin (hydrogenated rosin, disproportionated rosin, polymerized rosin etc.), unsaturated fatty acid-modified rosins or unsaturated fatty acid-modified rosin esters; metal salts of rosins (particularly, rosin esters) such as unmodified rosin, modified rosin, various rosin derivatives and the like; and the like. In addition, as the rosin derivative, a rosin phenol resin obtained by adding phenol to rosins (unmodified rosin, modified rosin, various rosin derivatives etc.) with an acid catalyst and subjecting same to thermal polymerization and the like can also be used.

Examples of the alcohol to be used for obtaining the above-mentioned rosin esters include divalent alcohols such as ethylene glycol, diethylene glycol, propylene glycol, neopentyl glycol and the like, trivalent alcohols such as glycerol, trimethylolethane, trimethylolpropane and the like, tetravalent alcohols such as pentaerythritol, diglycerol and the like, hexahydric alcohols such as dipentaerythritol etc. and the like. These are used alone or in a combination of two or more kinds thereof.

Examples of the petroleum tackifier resin include known petroleum resins such as aromatic petroleum resin, aliphatic petroleum resin, alicyclic petroleum resin (aliphatic cyclic petroleum resin), aliphatic aromatic petroleum resin, aliphatic alicyclic petroleum resin, hydrogenated petroleum resin, coumarone resin, coumarone indene resin and the like. Specific examples of the aromatic petroleum resin include polymers using one or more kinds of vinyl group-containing aromatic hydrocarbon having 8 to 10 carbon atoms (styrene, o-vinyltoluene, m-vinyltoluene, p-vinyltoluene, α-methylstyrene, β-methylstyrene, indene, methylindene etc.) and the like. As the aromatic petroleum resin, an aromatic petroleum resin obtained from a fraction such as vinyltoluene, indene and the like (i.e., "C9 petroleum fraction") (namely, "C9 based petroleum resin") can be used preferably. Examples of the aliphatic petroleum resin include polymers obtained by using one or more kinds selected from dienes such as olefin having 4 or 5 carbon atoms (e.g., butene-1, isobutylene, pentene-1 etc.), butadiene, piperylene, 1,3-pentadiene, isoprene etc., and the like. Furthermore, as the aliphatic petroleum resin, an aliphatic petroleum resin obtained from a fraction such as butadiene, piperylene, isoprene and the like (i.e., "C4 petroleum fraction", "C5 petroleum fraction" etc.) (namely, "C4 based petroleum resin", "C5 based petroleum resin" etc.) can be used preferably. Examples of the alicyclic petroleum resin include an alicyclic hydrocarbon resin obtained by cyclization and dimerization of an aliphatic petroleum resin (i.e., "C4 based petroleum resin", "C5 based petroleum resin" etc.), followed by polymerization, a polymer of a cyclic diene compound (cyclopentadiene, dicyclopentadiene, ethylidenenorbornane, dipentene, ethylidenebicycloheptene, vinylcycloheptene, tetrahydroindene, vinylcyclohexene, limonene etc.) or a hydrogenated resin thereof, an alicyclic hydrocarbon resin obtained by hydrogenating the aromatic ring of the aforementioned aromatic hydrocarbon resin, the following aliphatic aromatic petroleum resin and the like. Examples of the aliphatic aromatic petroleum resin include a styrene-olefin copolymer and the like. In addition, as the aliphatic aromatic petroleum resin, a so-called "C5/C9 copolymerization petroleum resin" and the like can be used.

In the present invention, the tackifier resin is preferably terpene tackifier resin and/or rosin based tackifier resin, particularly preferably rosin based tackifier resin, from the aspect of flame retardancy of gasket. The terpene tackifier resin and rosin based tackifier resin easily provide effect as flame-retardant auxiliary agents. Using these, adhesion of a gasket to an adherend and flame retardancy of a gasket can be improved more remarkably. The terpene tackifier resin is particularly preferably a terpenephenol resin, the rosin based tackifier resin is particularly preferably rosin ester (i.e., esterified compound of unmodified rosin, hydrogenated rosin, disproportionated rosin or polymerized rosin), and the rosin ester is preferably trivalent or higher polyhydric alcohol ester, particularly preferably tetra to hexahydric polyhydric alcohol ester.

One or more kinds of the tackifier resins can be used in combination, and the amount thereof to be used is not particularly limited. However, it is preferably not less than 5 parts by weight, more preferably not less than 10 parts by weight, particularly preferably not less than 15 parts by weight, relative to 100 parts by weight of the adhesive, since it becomes a carbon source and sufficiently exhibits the effect of a phosphorus flame retardant as an auxiliary agent. From the aspects of maintenance of adhesive property, preservability, handling property, dispersibility and the like, it is preferably not more than 100 parts by weight, more preferably not more than 60 parts by weight, particularly preferably not more than 40 parts by weight.

In the present invention, the pressure-sensitive adhesive sheet 1 can contain, where necessary, various additives such as plasticizer, filler made of glass fiber, glass bead, metal powder or other inorganic powder etc., pigment, colorant, antioxidant, UV absorber and the like.

In a gasket of an embodiment having a substrate film 2, the pressure-sensitive adhesive sheet 1 can contain an adhesion promoter to further enhance adhesiveness to the substrate film 2. Examples of the adhesion promoter include various silane coupling agents, epoxy resin and the like. Of these, silane coupling agents having a functional group such as an epoxy group, a methacryloyl group, a vinyl group and the like are preferable since they are effective for expression of adhesiveness. In addition, a catalyst for reacting a silyl group and an epoxy group can be added concurrently with a silane coupling agent and an epoxy resin. When the pressure-sensitive adhesive sheet containing a non-halogenated flame retardant contains a polyoxyalkylene adhesive (adhesive consisting of a cured product of a composition containing the above-mentioned components A-C), the catalyst should be selected in consideration of the influence on the curing reaction (hydrosilylation reaction) to produce the adhesive.

When the pressure-sensitive adhesive sheet contains a polyoxyalkylene adhesive as the adhesive, it may contain a storage stability improving agent to improve the storage stability. As the storage stability improving agent, a compound commonly known as a storage stabilizer for the component B of the present invention can be used without limitation. For example, a compound comprising an aliphatic unsaturated bond, an organic phosphorus compound, an organic sulfur compound, a nitrogen-containing compound, a tin compound, an organic peroxide and the like can be suitably used. Specifically, 2-benzothiazolyl sulfide, benzothiazole, thiazole, dimethylacetylene dicarboxylate, diethylacetylene dicarboxylate, 2,6-di-t-butyl-4-methylphenol, butylhydroxyanisole, vitamin E, 2-(4-morpholinyldithio)benzothiazole, 3-methyl-1-butene-3-ol, 2-methyl-3-butene-2-ol, organosiloxane containing an acetylenic unsaturated group, acetylene alcohol, 3-methyl-1-butyl-3-ol, diallyl fumarate, diallyl maleate, diethyl fumarate, diethyl maleate, dimethyl maleate, 2-pentenenitrile, 2,3-dichloropropene and the like can be included, but these are not to be construed as limiting.

(Substrate Film)

In the gasket of the present invention, the substrate film 2 is formed to impart self-supporting property to the pressure-sensitive adhesive sheet 1 to improve setting workability of gasket as well as more strictly prevent contact of water and the like to an adherend. That is, when the pressure-sensitive adhesive face of the pressure-sensitive adhesive sheet directly contacts an adherend, water and the like absorbed by the pressure-sensitive adhesive sheet contacts the adherend during long-term use of the gasket. When the adherend is a metal member without an anticorrosion treatment and the like, the metal member may corrode or may be discolored to impair desired function of the adherend. As shown in FIG. 2, therefore, a surface 2A of the substrate film 2 laminated on one surface of the pressure-sensitive adhesive sheet 1 is closely adhered to an adherend 21, from the two adherends 20, 21 to be closely adhered to the gasket, which requires protection from corrosion and discoloration at higher levels.

In the present invention, therefore, as substrate film 2, a film having not only heat resistance required of a gasket but also superior water-repellency, and/or comprising a material having high resistance to moisture permeability is preferable. For example, plastic films made of fluororesins such as polytetrafluoroethylene (PTFE), polychlorotrifluoroethylene (PCTFE), polyvinylidene fluoride (PVDF), polyvinyl fluoride (PVF), perfluoroalkoxyfluororesin (PFA), tetrafluoroethylene hexafluoropropylene copolymer (FEP), ethylene tetrafluoroethylene copolymer (ETFE), ethylene chlorotrifluoroethylene copolymer (ECTFE) and the like, are preferable, a fluororesin film is particularly preferable, and a polytetrafluoroethylene (PTFE) film is especially preferable.

The thickness of the substrate film 2 is preferably about 10-500 μm, more preferably 50-300 μm, particularly preferably 100-200 μm, to achieve good adhesion of a gasket to an adherend and improved detach workability for maintenance.

In addition, the surface of the substrate film 2 on the side of the pressure-sensitive adhesive sheet 1 is preferably subjected to a corona treatment, a sputter treatment, a sodium treatment and the like for the improvement of adhesiveness between the pressure-sensitive adhesive sheet and the substrate, and two or more of these surface treatments can be performed in combination.

(Core Film)

When the gasket of the present invention is a pressure-sensitive adhesive sheet having a core, as shown in FIG. 3, a core film 3 to be used is not particularly limited, and a film (a single layer film) comprised of one or more kinds of plastic selected from polyesters (e.g., polyethylene terephthalate (PET) etc.); nylon; polyvinyl chloride; polyvinyldene chloride; polyolefins (e.g., polyethylene, polypropylene, reactor TPO, ethylene-vinyl acetate copolymer and the like; fluororesins (e.g., polytetrafluoroethylene (PTFE), polychlorotrifluoroethylene (PCTFE), polyvinylidene fluoride (PVDF), polyvinyl fluoride (PVF), perfluoroalkoxyfluororesin (PFA), tetrafluoroethylene hexafluoropropylene copolymer (FEP), ethylene tetrafluoroethylene copolymer (ETFE), ethylene chlorotrifluoroethylene copolymer (ECTFE) etc.) and the like, metal foil, or a laminate film of two or more selected from these and the like can be mentioned. These films may be used in the form of a solid film (non-porous film), or a perforated film with mechanical perforation. Also, fiber sheet (single layer sheet, laminated sheet having two or more layers) such as knitted fabric, woven fabric, non-woven fabric and the like using one or more kinds of fibers selected from synthesis polymer fiber such as polyesters (e.g., polyethylene terephthalate (PET) etc.) and the like, natural fibers such as cotton, hemp and the like, metal fiber and glass fiber, and a laminate wherein one or more kinds of such fiber sheets are laminated on the aforementioned plastic film can also be used as the core film 3.

Among these, one having less open pores allowing passage of moister is preferable from the aspects of anti-moisture permeability (moisture barrier property), and a non-porous plastic film is particularly preferable. The plastic film preferably has transparency from the aspects of workability. When bolting is performed after arranging gaskets, the core film is preferably a sheet made of a glass fiber (particularly, glass cloth) from the aspects of bolting workability, strength upon detachment and the like. In addition, the fabric weight of the glass fiber sheet is preferably 5-1000 g/m$^2$ from the aspects of strength and transparency, and the thickness (diameter) of the glass fiber is preferably about 0.01-1 mm. When a glass cloth is used, it may be in the form of plain weave, satin weave, twill weave, mat weave and the like. Moreover, a glass cloth can show improved adhesiveness to an adhesive layer by applying a surface treatment with a silane coupling agent.

While the thickness of the core film varies depending on the material, form and the like of the film, it is generally 10-200 µm, preferably 30-150 µm, most preferably 50-100 µm.

In the gasket of the present invention, the production method of a pressure-sensitive adhesive sheet containing a non-halogenated flame retardant is not particularly limited, and a general production method of pressure-sensitive adhesive sheets can be applied.

A pressure-sensitive adhesive sheet containing a non-halogenated flame retardant, which uses an acrylic adhesive, can be produced by a method including, for example, mixing a photo polymerizable composition comprising a monomer for a base polymer main backbone, a copolymerizable monomer, a radical polymerization initiator, a crosslinking agent and the like with a non-halogenated flame retardant, applying same on the detach-treated surface of a release sheet to give a coated film with a desired thickness, adhering a detach-treated surface of the film to a release sheet, and irradiating an ultraviolet light to allow polymerization reaction to proceed. When the pressure-sensitive adhesive sheet contains a tackifier resin and other additives, they only need to be mixed with a photo polymerizable composition together with a non-halogenated flame retardant. When a gasket having a substrate film is to be obtained, a pressure-sensitive adhesive sheet containing a non-halogenated flame retardant can be formed in the same manner as in the above except that a substrate film is used instead of a release sheet, and a photo polymerizable composition containing a non-halogenated flame retardant and the like is applied on the substrate film.

A pressure-sensitive adhesive sheet containing a silicone adhesive can be formed by applying a silicone adhesive admixed with a non-halogenated flame retardant and the like on a detach-treated surface of a release sheet, adhering a detach-treated surface of a release sheet thereto, and subjecting same to predetermined drying by heating. When a gasket having a substrate film is to be obtained, a pressure-sensitive adhesive sheet containing a non-halogenated flame retardant can be formed in the same manner as in the above except that a substrate film is used instead of a release sheet, and a photo silicone adhesive containing a non-halogenated flame retardant and the like is applied to the substrate film.

A pressure-sensitive adhesive sheet containing a non-halogenated flame retardant, which uses an acrylic adhesive, and a pressure-sensitive adhesive sheet containing a non-halogenated flame retardant, which uses a silicone adhesive, can be produced by appropriately using a general release agent such as silicone release agent, fluorine release agent and the like for the detach treatment of a release sheet.

A pressure-sensitive adhesive sheet containing a non-halogenated flame retardant can be produced by, for example, the following method. First, the aforementioned components A-C and non-halogenated flame retardant (Component D) are charged in a stirring apparatus provided with a vacuum function together with an organic solvent as necessary, and defoamed by stirring in a vacuum state (in vacuo) to give a defoamed mixture (composition). When a tackifier resin and other additives are contained in a pressure-sensitive adhesive sheet containing a non-halogenated flame retardant, a tackifier resin and other additives are added together with the above-mentioned components A-D to give a mixture (composition). Then, a composition (mixture) containing components A-D after the defoaming treatment is applied on the detach-treated surface of a release sheet to form a coated film with a desired thickness. A detach-treated surface of a release sheet is adhered thereto, and a given heat treatment is applied to cure the composition (mixture) containing components A-D. The curing reaction is completed since the alkenyl group of component A (polyoxyalkylene polymer having at least one alkenyl group in each molecule) is hydrosilylated by the hydrosilyl group (group having Si—H bond) of component B (compound containing two or more hydrosilyl groups on average in each molecule) in the presence of a hydrosilylation catalyst (component C) to allow crosslinking to proceed. A gasket having a substrate film is obtained, a pressure-sensitive adhesive sheet containing a non-halogenated flame retardant can be formed in the same manner as in the above except that a substrate film is used instead of a release sheet and a composition (mixture) containing components A-D after the defoaming treatment is applied on the substrate film.

The mixture can be applied to for example, a commonly known coating apparatus such as a gravure coater; a roll coater such as a kiss coater or a comma coater; a die coater such as a slot coater or a fountain coater; a squeeze coater, a curtain coater and the like. Regarding the heat treatment conditions in this case, it is preferable that the composition be heated at 50 to 200° C. (preferably 100 to 160° C.) for about 0.01 to 24 hours (preferably 0.05 to 4 hours). As the above-described stirrer with vacuum function, a commonly known stirrer equipped with vacuum apparatus may be used; specifically, a planetary (revolution type/rotation type) stirring defoaming apparatus, a defoaming apparatus equipped with a disperser, and the like can be included. The degree of pressure reduction in performing vacuum defoaming is preferably not more than 10 kPa, more preferably not more than 3 kPa. Stirring time varies also depending on the choice of stirrer and the throughput of fluidized product, and is generally preferably about 0.5 to 2 hours. Due to the defoaming treatment, the resulting adhesive layer is substantially free of a void, and high transparency can be achieved.

Release agent include silicone type release treatment agent, fluoride type release treatment agent, long chain alkyl type release treatment agent etc. can be applied to the support surface. Of these, a silicone type release treatment agent is preferable. As the curing method, a curing method such as UV irradiation, electron beam irradiation and the like are preferably used. Furthermore, of the silicone type release treatment agents, a cation polymerizable UV curing silicone type release treatment agent is preferable. A cation polymerizable UV curing silicone type release treatment agent is a mixture of a cation polymerizable silicone (polyorganosiloxane having an epoxy functional group in a molecule) and an onium salt photoinitiator. Such agent wherein the onium salt photoinitiator is a boron photoinitiator is particularly preferable. Using such a cation polymerizable UV curing silicone type release treatment agent wherein the onium salt photoinitiator is a boron photoinitiator, particularly good releaseability (mold releaseability) can be obtained. A cation polymerizable silicone (polyorganosiloxane having an epoxy functional group in a molecule) has at least two epoxy functional groups in one molecule, which may be linear or branched chain, or a mixture of these. While the kind of an epoxy functional group contained in polyorganosiloxane is not particularly limited, it only needs to permit progress of cationic ring-opening polymerization by an onium salt photoinitiator. Specific examples thereof include γ-glycidyloxypropyl group, β-(3,4-epoxycyclohexyl)ethyl group, β-(4-methyl-3,4-epoxycyclohexyl)propyl group and the like. Such cation polymerizable silicone (polyorganosiloxane having an epoxy functional group in a molecule) is marketed and a commercially available product can be used. For example, UV9315, UV9430, UV9300, TPR6500, TPR6501 and the like manufactured by Toshiba Silicone Co., Ltd., X-62-7622, X-62-7629, X-62-7655, X-62-7660, X-62-7634A and the like manufactured by Shin-Etsu Chemical Co., Ltd., Poly200, Poly201, RCA200, RCA250, RCA251 and the like manufactured by Arakawa Chemical Industries, Ltd.

Of the cationic polymerizable silicones, polyorganosiloxane comprising the following structural units (A)-(C) is particularly preferable.

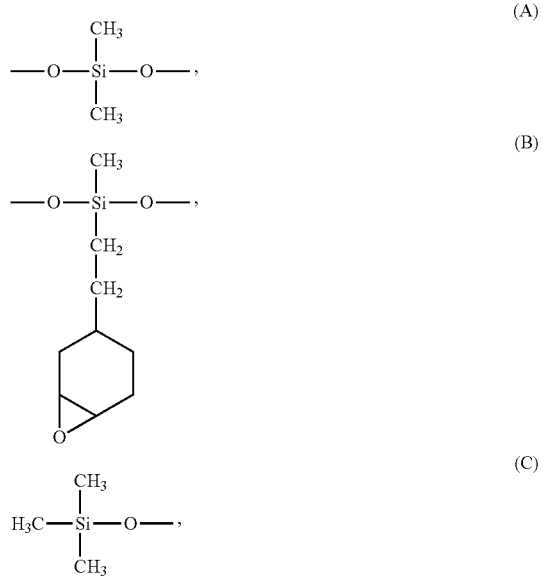

In polyorganosiloxane comprising such structural units (A)-(C), the composition ratio ((A):(B):(C)) of structural units (A)-(C) is particularly preferably 50-95:2-30:1-30 (mol %), and especially preferably 50-90:2-20:2-20 (mol %). Polyorganosiloxane comprising such structural units (A)-(C) is available as Poly200, Poly201, RCA200, X-62-7622, X-62-7629 and X-62-7660.

On the other hand, as the onium salt photoinitiator, a known product can be used without particular limitation. Specific examples include a compound represented by $(R^1)_2I^+X^-$, $ArN_2^+X^-$ or $(R^1)_3S^+X^-$ (wherein $R^1$ is alkyl group and/or aryl group, Ar is aryl group, $X^-$ is $[B(C_6H_5)_4]^-$, $[B(C_6F_5)_4]^-$, $[B(C_6H_4CF_3)_4]^-$, $[(C_6F_5)_2BF_2]^-$, $[C_6F_5BF_3]^-$, $[B(C_6H_3F_2)_4]^-$, $BF_4^-$, $PF_6^-$, $AsF_6^-$, $HSO_4^-$, $ClO_4^-$ and the like). Of these, a compound of the formula (boron photoinitiator) wherein $X^-$ is $[B(C_6H_5)_4]^-$, $[B(C_6F_5)_4]^-$, $[B(C_6H_4CF_3)_4]^-$, $[(C_6F_5)_2BF_2]^-$, $[C_6F_5BF_3]^-$, $[B(C_6H_3F_2)_4]^-$ or $BF_4^-$ is preferable, and a compound represented by $(R^1)_2I^+[B(C_6F_5)_4]^-$ (wherein $R^1$ is substituted or unsubstituted phenyl group) (alkyl iodonium, tetrakis(pentafluorophenyl)borate) is particularly preferable. As the onium salt photoinitiator, antimony (Sb) initiator is conventionally known. However, when an antimony (Sb) initiator is used, peel strength becomes heavier and peeling of transparent pressure-sensitive adhesive sheet from the release sheet tends to be difficult.

While the amount of the onium salt photoinitiator to be used is not particularly limited, it is preferably about 0.1-10 parts by weight relative to 100 parts by weight of the cationic polymerizable silicone (polyorganosiloxane). When the amount of use is smaller than 0.1 part by weight, curing of the silicone release layer may become insufficient. When the amount of use is greater than 10 parts by weight, the cost becomes impractical. When a cationic polymerizable silicone (polyorganosiloxan) and an onium salt photoinitiator are mixed, the onium salt photoinitiator may be dissolved or dispersed in an organic solvent and then mixed with polyorganosiloxan. Specific examples of the organic solvent include alcohol solvents such as isopropyl alcohol, n-butanol and the like; ketone solvents such as acetone, methylethyl ketone and the like; ester solvents such as ethyl acetate, and the like, and the like.

A detach treatment agent can be applied, for example, using a general coating apparatus such as those used for roll coater method, reverse coater method, doctor blade method and the like. While the coating amount (solid content) of the detach treatment agent is not particularly limited, it is generally about 0.05-6 mg/cm².

Figure 4:
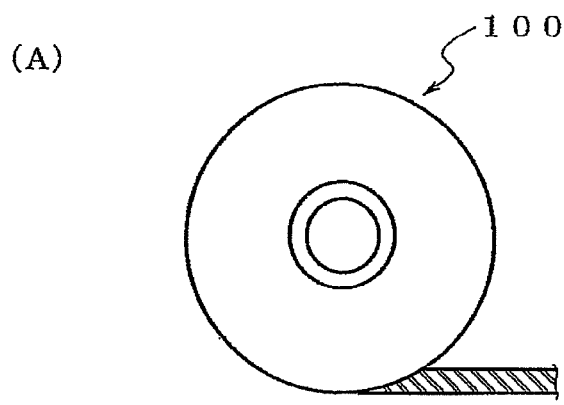
FIG. 4(A) is a schematic view of the gasket of the present invention in a roll state and FIG. 4(B) is a partly enlarged sectional view of the gasket shown in FIG. 4(A).
Figure 4:
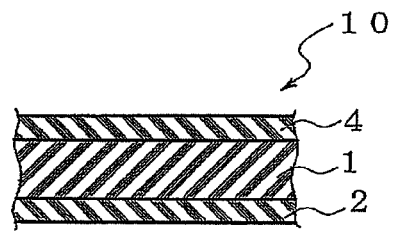

The gasket of the present invention is preferably constituted as a roll 100, as shown in FIG. 4(A) and FIG. 4(B), before mounting between two opposing faces. In this case, a substrate film 2 to be used is subjected to a detach treatment of the back face (one surface on the opposite side from the surface on which pressure-sensitive adhesive sheet 1 containing a non-halogenated flame retardant is formed). In the Figures, mark 4 is a release sheet.

Figure 5:
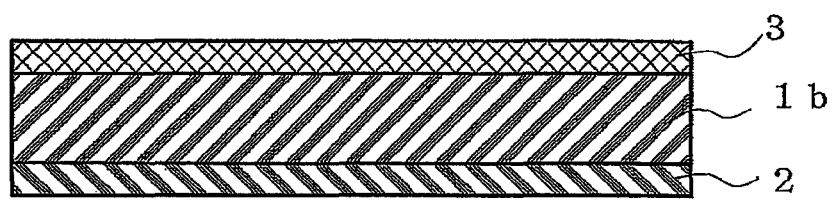
FIG. 5(A)-FIG. 5(C) are schematic views of the production steps of the gasket shown in FIG. 3.
Figure 5:
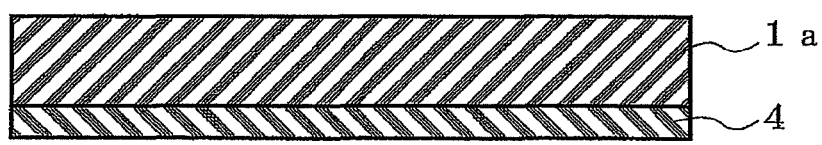
Figure 5:
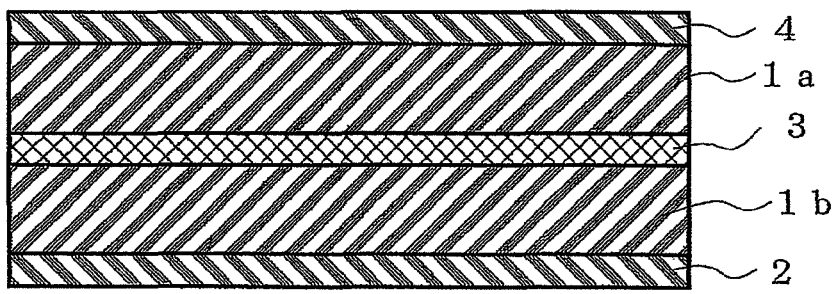

When the pressure-sensitive adhesive sheet containing a non-halogenated flame retardant is a pressure-sensitive adhesive sheet with a core as shown in FIG. 3, the gasket of the present invention is produced by the method shown in the following FIG. 5.

First, an adhesive layer 1b containing a non-halogenated flame retardant is formed on one surface of a substrate film 2, and a core film 3 is adhered thereto (FIG. 5(A)).

A release sheet 4 is prepared, and an adhesive layer 1a containing a non-halogenated flame retardant is formed on one surface of the release sheet 4 (FIG. 5(B)).

The adhesive layer 1a formed on one surface of the above-mentioned release sheet 4 is adhered to one surface (adhesive layer-free surface) of the core film 3 (FIG. 5(C)).

The gasket of the present invention is placed between two opposing faces and seals them without clearance by passing a bolt through a through-hole formed in a predefined position and bolting them together.

The gasket of the present invention can be used for sealing of two opposing faces of machines, instruments and structures in various technical fields. For example, it can be used for mounting various instruments and equipments on the outer board (body) of airframes and vehicles of aircrafts, cars, electric trains and the like, for structures where two members are fixed with their surfaces opposing with each other (i.e., forming two opposing faces) in airframes and vehicles of aircrafts, cars, electric trains and the like, and the like. Particularly, since the gasket has high flame retardancy and does not corrode metals, it is particularly advantageous as a material for aircrafts.

When the gasket of the present invention is formed using a pressure-sensitive adhesive sheet containing a non-halogenated flame retardant comprising a polyoxyalkylene adhesive, the adhesive force (release force) increases with time after adhesion of a surface (pressure-sensitive adhesive face) of the pressure-sensitive adhesive sheet to an adherend. As a result, more superior sealability can be afforded. Moreover, since the adhesive force (release force) does not increase excessively even after long-term adhesion to the adherend, the gasket can be easily separated from the adherend for maintenance.

A pressure-sensitive adhesive sheet containing a non-halogenated flame retardant using a polyoxyalkylene adhesive shows a shear storage elastic modulus (G') at −30° C. of not more than $6.0 \times 10^5$ (Pa), preferably not more than $5.5 \times 10^5$ (Pa). The shear storage elastic modulus (G') is known as an index of the hardness of viscoelastic body. Since a pressure-sensitive adhesive sheet containing a non-halogenated flame retardant using a polyoxyalkylene adhesive shows a shear storage elastic modulus (G') at −30° C. of not more than $6.0 \times 10^5$ (Pa), and does not become rigid at low temperatures, it is considered to maintain high flexibility even at a temperature below zero. In consideration of the time-temperature reduction rule, a high-speed deformation at a certain temperature is influenced by the property of a viscoelastic body at a lower temperature. Therefore, the discussion of an adhesive force at −30° C. should take into consideration viscoelastic behavior at a lower temperature. The pressure-sensitive adhesive sheet containing a non-halogenated flame retardant using a polyoxyalkylene adhesive in the gasket of the present invention also shows a shear storage elastic modulus at −50° C. of not more than $6.0 \times 10^5$. Therefore, the adhesion stability at a lower temperature is considered to be highly superior. The "shear storage modulus (G')" here is measured by the following method.

[Shear Storage Modulus (G')]

Plural samples are prepared by forming an adhesive layer on a release-treated surface of a release sheet, and the obtained adhesive layers are adhered to each other to give a laminate having a thickness of about 0.5-1 mm. The laminate is cut into a disc having a diameter of 7.9 mm and used as a sample for the measurement using the following apparatus and conditions.

measurement apparatus: ARES manufactured by Rheometric Scientific Inc.

measurement condition: measurement temperature −30° C. and −50° C.

measurement frequency 1 Hz (6.28 rad/sec)

The present invention is explained in more detail in the following by referring to Examples and Comparative Examples. The property evaluation (test) of the gasket material in the Examples and Comparative Examples was performed according to the following methods.

1. Initial Adhesion Force to SUS

A 25 μm-thick PET film was laminated on the adhesive layer on one surface of the gasket material, which was cut into 25 mm width to give samples. The other adhesive layer of the sample was adhered to a SUS304 plate by one reciprocation of a 2 kg roller, and the laminate was stood at room temperature for 30 min. Using a tensile tester, the initial adhesion force was measured at tension rate 300 mm/min, removal angle 180°.

2. Removability

A 25 μm-thick PET film was laminated (on the adhesive layer) on one surface of the gasket, which was cut into 25 mm width to give samples. The other adhesive layer of the sample was adhered to a SUS304 plate by one reciprocation of a 2 kg roller, and the laminate was stood in the environment of temperature: 23° C., humidity: 65% RH for 240 hr, after which the destruction state of the gasket material was observed by manually removing the sample from the SUS plate. The gasket removed at the interface with the adherend without destruction was marked with pass (○), and the gasket destructed leaving the residue of the adhesive layer on the adherend was marked with failure (x).

3. Combustion Test

Performed according to UL STANDARD "UL-94".

To be specific, 3 kinds of samples (length 5 inch×width 1 inch, thickness maximum, thickness minimum, and thickness medium) were prepared, and subjected to the test under the following conditions. Five samples each for thickness maximum, minimum and medium were prepared, and a total of 15 samples were subjected to the test.

test atmosphere: air firing: 10 seconds test procedure: after flame contact for 10 seconds, test flame was removed and the flaming time and glowing time were recorded. When the fire ceased within 30 seconds, flame contact was performed for 10 seconds.

(Evaluation Criteria)

According to UL STANDARD "UL-94". Evaluated on grades (5VA, 5VB, V-0, V-1, V-2, HB).

4. Metal Corrosiveness

A 1 inch×1 inch gasket was adhered to a copper plate, and left standing under humidified conditions (40° C.×92% atmosphere) for 100 hr. The copper plate was taken out from the humidified conditions, the gasket was peeled off, the surface of the plate was observed and the presence or absence of discoloration was visually confirmed.

In the evaluation, the absence of discoloration is good (○), presence of slight discoloration is pass (Δ), and remarkable discoloration is disapproval (x).

5. Halogen Content

Measured according to JISK0127.

Detection of not less than 5 ppm of halogen such as Cl, Br and the like is failure (x), and detection amount of less than 5 ppm is pass (○).

Example 1

A composition containing a polyoxyalkylene polymer as component A, a hydrosilyl compound as component B (in such an amount that the functional group ratio of the amount of hydrosilyl group to the amount of alkenyl group in polyoxyalkylene polymer as component A is 1:2), a hydrosilylation catalyst as component C (in an amount corresponding to 0.04 mol per 1 mol of alkenyl group in component A), tricresylphosphate (TCP) as component D (non-halogenated flame retardant) (50 parts by weight per 100 parts by weight of total of components A-C) and rosin pentaerythritol (25 parts by weight per 100 parts by weight of total of components A-C) was applied to a release-treated surface of a polyethylene terephthalate film release sheet, and heat-treated at 130° C. for 10 min. Thereon was placed a release-treated surface of the polyethylene terephthalate film release sheet to give a pressure-sensitive adhesive sheet (thickness 1000 μm).

Example 2

In the same manner as in Example 1 except that ammonium polyphosphate (APP) (50 parts by weight per 100 parts by weight of the total amount of components A-C) was used instead of tricresylphosphate (TCP), a pressure-sensitive adhesive sheet was formed.

Example 3

In the same manner as in Example 1 except that tricresylphosphate (TCP, 25 parts by weight) and polyphosphoric acid ammonium (APP, 25 parts by weight) were used per 100 parts by weight of the total amount of components A-C, a pressure-sensitive adhesive sheet was formed.

Example 4

The composition containing components A-C, tricresylphosphate (TCP) and rosin pentaerythritol, which was used in Example 1, was applied to a release-treated surface of a polyethylene terephthalate film release sheet, and the film was heat-treated at 130° C. for 10 min. Thereon was placed a sodium-treated surface of a polytetrafluoroethylene film (thickness: 130 μm) to give a pressure-sensitive adhesive sheet (thickness 1000 μm).

Example 5

The composition containing components A-C, polyphosphoric acid ammonium (APP) and rosin pentaerythritol, which was used in Example 2, was applied to a release-treated surface of a polyethylene terephthalate film release sheet, and the film was heat-treated at 130° C. for 10 min. Thereon was placed a sodium-treated surface of a polytetrafluoroethylene film (thickness: 130 μm) to give a pressure-sensitive adhesive sheet (thickness 1000 μm).

Example 6

The composition containing components A-C, tricresylphosphate (TCP), polyphosphoric acid ammonium (APP) and rosin pentaerythritol, which was used in Example 3, was applied to a release-treated surface of a polyethylene terephthalate film release sheet, and the film was heat-treated at 130° C. for 10 min. Thereon was placed a sodium-treated surface of a polytetrafluoroethylene film (thickness: 130 μm) to give a pressure-sensitive adhesive sheet (thickness 1000 μm).

Example 7

The composition containing components A-C, tricresylphosphate (TCP) and terpenephenol (25 parts by weight per 100 parts by weight of the total amount of components A-C), which was used in Example 1, was applied to a release-treated surface of a polyethylene terephthalate film release sheet, and the film was heat-treated at 130° C. for 10 min. Thereon was placed a sodium-treated surface of a polytetrafluoroethylene film (thickness: 130 μm) to give a pressure-sensitive adhesive sheet (thickness 1000 μm).

Example 8

A composition containing butyl acrylate copolymer solution (100 parts by weight), an isocyanate based crosslinking agent (CORONATEL-45 manufactured by Japan Polyurethane, solid content 45%, 1 part by weight), tricresylphosphate (50 parts by weight per 100 parts by weight of the total amount of butyl acrylate copolymer solution and isocyanate based crosslinking agent), and rosin pentaerythritol (25 parts by weight per 100 parts by weight of the total amount of butyl acrylate copolymer solution and isocyanate based crosslinking agent) was applied to a release-treated surface of a polyethylene terephthalate film release sheet, and the film was heat-treated at 80° C. for 3 min. Thereon was placed a sodium-treated surface of a polytetrafluoroethylene film (thickness: 130 μm) to give a pressure-sensitive adhesive sheet (thickness 1000 μm).

Example 9

In the same manner as in Example 8 except that terpenephenol (25 parts by weight per 100 parts by weight of the total amount of components A-C) was used instead of rosin pentaerythritol, a pressure-sensitive adhesive sheet was formed.

Example 10

A composition containing tricresylphosphate (50 parts by weight per 100 parts by weight of cyclohexylacrylate copolymer) per 100 parts by weight of cyclohexylacrylate copolymer was applied to be sandwiched between silicone release-treated PET films, and ultraviolet light was irradiated from one surface (1 mW/cm$^2$ for 3 min, thereafter 7 mW/cm$^2$ for 3 min) to complete photo polymerization, whereby a pressure-sensitive adhesive sheet (thickness 1000 pin) was formed.

Example 11

A composition containing tricresylphosphate (50 parts by weight per 100 parts by weight of cyclohexylacrylate copolymer) per 100 parts by weight of cyclohexylacrylate copolymer was applied to be sandwiched between silicone release-treated PET films, and ultraviolet light was irradiated from one surface (1 mW/cm$^2$ for 3 min, thereafter 7 mW/cm$^2$ for 3 min) to complete photo polymerization. The PET film was peeled off from one surface, and a sodium-treated surface of a polytetrafluoroethylene film (thickness: 130 μm) was placed thereon to give a pressure-sensitive adhesive sheet (thickness 1000 μm).

Example 12

A composition containing a polyoxyalkylene based polymer as component A, a hydrosilyl compound as component B (in such an amount that the functional group ratio of the amount of hydrosilyl group to the amount of alkenyl group in polyoxyalkylene based polymer as component A is 1:2), a hydrosilylation catalyst as component C (in an amount corresponding to 0.04 mol per 1 mol of alkenyl group in component A), tricresylphosphate (TCP) as component D (non-halogenated flame retardant) (20 parts by weight per 100 parts by weight of total of components A-C) and polyphosphoric acid ammonium (APP) (50 parts by weight per 100 parts by weight of total of components A-C) was applied to a release-treated surface of a polyethylene terephthalate film release sheet, and heat-treated at 130° C. for 10 min. Thereon was placed a sodium-treated surface of a polytetrafluoroethylene film (thickness: 130 μm) to give a pressure-sensitive adhesive sheet (thickness 1000 μm).

Example 13

In the same manner as in Example 12 except that a composition containing the composition used in Example 12 and rosin pentaerythritol (10 parts by weight per 100 parts by weight of the total amount of components A-C) was used, a pressure-sensitive adhesive sheet (thickness 1000 μm) was formed.

Example 14

In the same manner as in Example 12 except that a composition containing the composition used in Example 12 and rosin pentaerythritol (20 parts by weight per 100 parts by weight of the total amount of components A-C) was used, a pressure-sensitive adhesive sheet (thickness 1000 μm) was formed.

Comparative Example 1

A composition containing a polyoxyalkylene polymer as component A, a hydrosilyl compound as component B (in such an amount that the functional group ratio of the amount of hydrosilyl group to the amount of alkenyl group in polyoxyalkylene polymer as component A is 2:5), a hydrosilylation catalyst as component C (in an amount corresponding to 1 mol per 1 mol of alkenyl group in component A) and rosin pentaerythritol (25 parts by weight per 100 parts by weight of total of components A-C) was applied to a release-treated surface of a polyethylene terephthalate film release sheet, a release-treated surface of the polyethylene terephthalate film release sheet was placed thereon and the laminate was heat-treated at 130° C. for 10 min to give a pressure-sensitive adhesive sheet (thickness 1000 μm).

Comparative Example 2

A composition containing a urethane resin solution, multifunctional isocyanate and hexacyclobromododecane (20 parts by weight per 100 parts by weight of the total amount of the urethane resin solution and multifunctional isocyanate component) was applied to a release-treated surface of a polyethylene terephthalate film release sheet, and the film was heat-treated at 100° C. for 2 min to give a pressure-sensitive adhesive sheet (thickness 1000 μm).

Comparative Example 3

A composition containing a urethane resin solution, multifunctional isocyanate and hexacyclobromododecane (20 parts by weight per 100 parts by weight of the total amount of the urethane resin solution and multifunctional isocyanate component) was applied to a sodium-treated surface of a polytetrafluoroethylene film (thickness: 130 μm), and the film was heat-treated at 100° C. for 2 min to give a pressure-sensitive adhesive sheet (thickness 1000 μm).

Comparative Example 4

A composition containing butyl acrylate copolymer solution (100 parts by weight), an isocyanate based crosslinking agent (CORONATEL-45 manufactured by Japan Polyurethane, solid content 45%, 1 part), and rosin pentaerythritol (25 parts by weight per 100 parts by weight of the total amount of butyl acrylate copolymer solution and isocyanate based crosslinking agent) was applied to a release-treated surface of a polyethylene terephthalate film release sheet, and the film was heat-treated at 80° C. for 3 min. Thereon was placed a release-treated surface of a polyethylene terephthalate film release sheet to give a pressure-sensitive adhesive sheet (thickness 1000 μm).

Each of the pressure-sensitive adhesive sheets produced in Examples 1-14 and Comparative Examples 1-4 as mentioned above were subjected to the aforementioned tests.

TABLE 1

| | | flame retardant (parts) | | | tackifier (parts) | | | sealing property (vs SUS plate) initial | | | | |
|---|---|---|---|---|---|---|---|---|---|---|---|---|
| | adhesive | tricresyl phosphate | ammonium polyphosphate | hexacyclo-bromo-dodecane | rosin penta-erythritol | terpene-phenol | sub-strate PTFE | adhesive force (N/25 mm) | remov-ability | combus-tion test UL test | metal corrosive-ness | halogen amount |
| Com. Ex. 1 | polyoxy-alkylene | — | — | — | 25 | — | absent | 3.5 | ○ | combusted | Δ | ○ |
| Com. Ex. 2 | poly-urethane | — | — | 20 | — | — | absent | 4 | ○ | combusted | Δ | x |
| Com. Ex. 3 | poly-urethane | — | — | 20 | — | — | present | 4 | ○ | combusted | ○ | x |
| Com. Ex. 4 | butyl acrylate | — | — | — | 25 | — | absent | 8 | Δ | combusted | Δ | ○ |
| Ex. 1 | polyoxy-alkylene | 50 | — | — | 25 | — | absent | 2.5 | ○ | V-0 | Δ | ○ |
| Ex. 2 | polyoxy-alkylene | — | 50 | — | 25 | — | absent | 2.5 | ○ | V-0 | Δ | ○ |
| Ex. 3 | polyoxy-alkylene | 25 | 25 | — | 25 | — | absent | 2.5 | ○ | V-0 | Δ | ○ |
| Ex. 4 | polyoxy-alkylene | 50 | — | — | 25 | — | present | 2.5 | ○ | V-0 | ○ | ○ |
| Ex. 5 | polyoxy-alkylene | — | 50 | — | 25 | — | present | 2.5 | ○ | V-0 | ○ | ○ |
| Ex. 6 | polyoxy-alkylene | 25 | 25 | — | 25 | — | present | 2.5 | ○ | V-0 | ○ | ○ |
| Ex. 7 | polyoxy-alkylene | 50 | — | — | — | 25 | present | 2.5 | ○ | V-0 | ○ | ○ |
| Ex. 8 | butyl acrylate | 50 | — | — | 25 | — | present | 8.5 | Δ | V-0 | ○ | ○ |
| Ex. 9 | butyl acrylate | 50 | — | — | — | 25 | present | 8 | Δ | V-0 | ○ | ○ |
| Ex. 10 | cyclohexyl-acrylate | 50 | — | — | — | — | absent | 4.5 | ○ | V-1 | Δ | ○ |
| Ex. 11 | cyclohexyl-acrylate | 50 | — | — | — | — | present | 4.5 | ○ | V-1 | ○ | ○ |
| Ex. 12 | polyoxy-alkylene | 20 | 50 | — | — | — | present | 2 | ○ | V-1 | ○ | ○ |

TABLE 1-continued

| | adhesive | flame retardant (parts) | | | tackifier (parts) | | sub-strate PTFE | sealing property (vs SUS plate) initial adhesive force (N/25 mm) | remov-ability | combus-tion test UL test | metal corrosive-ness | halogen amount |
|---|---|---|---|---|---|---|---|---|---|---|---|---|
| | | tricresyl phosphate | ammonium polyphos-phate | hexacyclo-bromo-dodecane | rosin penta-erythritol | terpene-phenol | | | | | | |
| Ex. 13 | polyoxy-alkylene | 20 | 50 | — | 10 | — | present | 2.5 | ○ | V-0 | ○ | ○ |
| Ex. 14 | polyoxy-alkylene | 20 | 50 | — | 20 | — | present | 4 | ○ | V-0 | ○ | ○ |

As is clear from Table 1, the gasket of the present invention has superior flame retardancy, does not contain a halogen atom, and achieves a flame retardant gasket that can suppress corrosion of metal low when it contacts the metal. Particularly, Examples 4-7 clearly afforded high-performance gaskets that do not corrode metal in contact therewith and show extremely high flame retardancy. Furthermore, the gaskets of Examples 13-14 wherein the amount of the tackifies resin was 10-20 parts by weight could suppress production of foam in a pressure-sensitive adhesive sheet, which is a problem during production, while maintaining removability and flame retardancy, and gaskets superior in appearance could be obtained.

The invention claimed is:

1. A gasket comprised of a substrate film and a pressure-sensitive adhesive sheet comprising a polyoxyalkylene pressure-sensitive adhesive, a non-halogenated flame retardant and a tackifier resin,
   wherein one surface of the gasket is the substrate film, and a other surface of the gasket is a pressure-sensitive adhesive face of the pressure-sensitive adhesive sheet,
   wherein the substrate film is laminated on one surface of the pressure-sensitive adhesive sheet to achieve the gasket,
   wherein the non-halogenated flame retardant is tricresyl phosphate and/or ammonium polyphosphate,
   wherein the tackifier resin is a terpenephenol resin and/or a rosin ester,
   wherein an amount of the non-halogenated flame retardant is not less than 50 parts by weight and not more than 150 parts by weight with respect to 100 parts by weight of the polyoxyalkylene pressure-sensitive adhesive,
   wherein an amount of the tackifier resin is not less than 10 parts by weight and not more than 40 parts by weight with respect to 100 parts by weight of the polyoxyalkylene pressure-sensitive adhesive,
   wherein a thickness of the pressure-sensitive adhesive sheet is not less than 800 μm, and
   wherein a thickness of the substrate film is 10-500 μm.

2. The gasket of claim 1, wherein the substrate film is a fluororesin sheet.

3. The gasket of claim 1, wherein the pressure-sensitive adhesive sheet is comprised of a cured product of a composition comprising the following components A-D:
   A: a polyoxyalkylene polymer having at least one alkenyl group in one molecule
   B: a compound containing two or more hydrosilyl groups on average in one molecule
   C: a hydrosilylation catalyst, and
   D: the non-halogenated flame retardant.

4. A method of tightly sealing two opposing faces, comprising placing the gasket of claim 1 between the two opposing faces.

* * * * *